United States Patent [19]

Chase et al.

[11] Patent Number: 5,637,362
[45] Date of Patent: Jun. 10, 1997

[54] THIN, SEALANT-COATED, FIBER-REINFORCED GYPSUM PANEL

[75] Inventors: Peter D. Chase, Houlton, Me.; Lloyd M. George; John D. McInnis, both of Port Hawkesbury, Canada; Thomas P. Krawiec, Nova Scotia, Canada

[73] Assignee: Louisiana-Pacific Corporation, Portland, Oreg.

[21] Appl. No.: 477,769

[22] Filed: Jun. 7, 1995

Related U.S. Application Data

[62] Division of Ser. No. 109,494, Aug. 20, 1993.

[51] Int. Cl.$^6$ ............................................. C04B 11/00
[52] U.S. Cl. .................... 428/15; 156/42; 428/703
[58] Field of Search ........................ 428/15, 703; 156/42

[56] References Cited

U.S. PATENT DOCUMENTS

| | | | |
|---|---|---|---|
| 135,582 | 2/1873 | Pfund | 106/707 |
| 1,325,883 | 12/1919 | Sexton | 156/41 X |
| 1,463,123 | 7/1923 | McAllister | 106/609 |
| 1,608,562 | 11/1926 | Melandri | 106/731 |
| 1,702,966 | 2/1929 | Haggerty | 106/780 |
| 1,859,853 | 5/1932 | Thomson | 156/39 |
| 1,932,956 | 10/1933 | Crandell | 428/703 X |
| 1,976,684 | 10/1934 | Munroe et al. | 156/41 |
| 2,125,046 | 7/1938 | Crandell | 106/673 X |
| 2,301,597 | 11/1942 | Welty et al. | 106/780 |
| 2,310,023 | 2/1943 | Gardner | 106/730 |
| 2,560,521 | 7/1951 | Camp | 156/41 |
| 2,631,381 | 3/1953 | Burrows | 34/144 |
| 2,705,198 | 3/1955 | Seybold | 162/181.7 |
| 2,731,337 | 1/1956 | Morrill et al. | 504/330 |
| 2,760,885 | 8/1956 | Larsen et al. | 428/451 |
| 2,803,575 | 8/1957 | Riddell et al. | 428/703 X |
| 2,927,909 | 3/1960 | Lyons et al. | 528/33 |
| 2,940,505 | 6/1960 | Brothers | 156/39 |
| 2,954,302 | 9/1960 | Gorman, Jr. | 156/41 |
| 3,106,500 | 10/1963 | Turner | 156/91 |
| 3,271,492 | 9/1966 | Elmendorf | 264/122 |
| 3,290,018 | 12/1966 | Stapelfeldt | 366/2 |
| 3,414,462 | 12/1968 | Cafferata | 428/218 |
| 3,462,339 | 8/1969 | Poms | 428/70 |
| 3,592,670 | 7/1971 | Kossuth et al. | 106/780 |
| 3,607,486 | 9/1971 | Jacks et al. | 156/41 |
| 3,616,173 | 10/1971 | Greene et al. | 428/331 |
| 3,737,265 | 6/1973 | Schafer et al. | 425/140 |
| 3,770,468 | 11/1973 | Knauf et al. | 106/675 |
| 3,809,566 | 5/1974 | Revord | 106/783 |
| 3,839,059 | 10/1974 | Rothfelder et al. | 106/644 |
| 3,872,204 | 3/1975 | Yano et al. | 264/102 |
| 3,935,021 | 1/1976 | Greve et al. | 106/660 X |
| 3,944,698 | 3/1976 | Dierks et al. | 428/219 |
| 3,951,735 | 4/1976 | Kondo et al. | 162/133 |
| 4,060,580 | 11/1977 | Pampel | 264/109 |
| 4,117,070 | 9/1978 | O'Neill | 264/234 |
| 4,146,564 | 3/1979 | Garrick et al. | 264/516 |
| 4,195,110 | 3/1980 | Dierks et al. | 428/218 |
| 4,233,368 | 11/1980 | Baehr et al. | 428/187 |
| 4,265,979 | 5/1981 | Baehr et al. | 428/171 |
| 4,328,178 | 5/1982 | Kossatz | 264/69 |
| 4,340,521 | 7/1982 | Deleuil | 524/2 |
| 4,341,560 | 7/1982 | Saito et al. | 106/677 X |
| 4,344,804 | 8/1982 | Bijen et al. | 428/703 X |
| 4,421,704 | 12/1983 | Reily | 264/133 |
| 4,645,548 | 2/1987 | Take et al. | 156/39 |
| 4,647,496 | 3/1987 | Lehnert et al. | 428/251 |
| 4,680,907 | 7/1987 | Williams | 428/150 X |
| 4,722,866 | 2/1988 | Wilson et al. | 428/411.1 |
| 4,810,569 | 3/1989 | Lehnert et al. | 428/285 |
| 4,942,003 | 7/1990 | Bold | 264/40.4 |
| 5,135,805 | 8/1992 | Sellers et al. | 428/302 |
| 5,148,645 | 9/1992 | Lehnert et al. | 52/443 |
| 5,171,366 | 12/1992 | Richards et al. | 106/772 |
| 5,342,566 | 8/1994 | Schafer et al. | 264/102 |

FOREIGN PATENT DOCUMENTS

| | | |
|---|---|---|
| 360901 | 2/1981 | Austria . |
| 1261125 | 9/1989 | Canada . |
| 0019207 | 11/1980 | European Pat. Off. . |
| 0143939 | 6/1985 | European Pat. Off. . |
| 1784657 | 8/1971 | Germany . |
| 2229147 | 1/1974 | Germany . |

(List continued on next page.)

OTHER PUBLICATIONS

Material Safety Data Sheet for Dow Corning's "777 Water Repellant," dated Oct. 7, 1991.
Bulletin of the Federal Research Institute for Forestry and Wood, No. 124, pp. 98–120, Jan. 1979.
Louisiana–Pacific, "The wallboard of the future has arrived", 1-0-P/AD 12M Apr. 1990, dated Apr. 20, 1990.
Louisiana–Pacific, "Introducing FiberBond The closest distance yet", undated.
Schenck "New Resources, New Ways to Conserve Gypsum-Fiber Board", (believed to be published Apr., 1989).

*Primary Examiner*—Henry F. Epstein
*Attorney, Agent, or Firm*—Finnegan, Henderson, Farabow, Garrett & Dunner

[57] ABSTRACT

A process for making a thin, sealant-coated, fire and indentation resistant gypsum panel. A layer of a mixture of cellulosic fibers moistened with water and an additive to restrict the adhesion of cellulosic fibers to one another, is deposited on at least two separate conveyors to form a fibrous matt on each conveyor. A layer of dry calcined gypsum containing set accelerator is deposited on the fibrous matt on each conveyor which contains, by weight on a dry weight basis, about 70–90% gypsum, about 10%–19% cellulosic fiber and about 1%–9% of combined additive and set accelerator. Each layer on each conveyor is directed to a mixing station to form a homogeneous layer, and the formed homogeneous layers on separate conveyors are placed atop one another on a single conveyor to form a combined homogeneous layer. Water is added to the layer or layers to rehydrate calcined gypsum. The combined homogeneous layer is subjected to pressure to form a pressed, homogeneous fiber-reinforced gypsum panel, and dried. The surface of the dried panel is sealed with wax-free, water resistant sealant. Sealant-coated, fire resistant, indentation resistant gypsum panels having a thickness of about 0.25 inch and a density of about 60 to 80 lbs./ft.$^3$ are made from 2 homogeneous layers of fiber-reinforced gypsum.

11 Claims, No Drawings

FOREIGN PATENT DOCUMENTS

| | | |
|---|---|---|
| 2257827 | 6/1974 | Germany . |
| 2808423 | 9/1978 | Germany . |
| 2919311 | 9/1980 | Germany . |
| 3439493 | 5/1986 | Germany . |
| 3404658 | 8/1986 | Germany . |
| 3822759 | 1/1990 | Germany . |
| 4127932 | 2/1993 | Germany . |
| 173986 | 2/1980 | Hungary . |
| 52-47814 | 4/1977 | Japan . |
| 62-26904 | 6/1987 | Japan . |
| 81561 | 5/1956 | Netherlands . |
| 596403 | 3/1978 | Switzerland . |
| 606987 | 4/1978 | U.S.S.R. . |
| 463108 | 3/1936 | United Kingdom . |
| 772581 | 4/1957 | United Kingdom . |

THIN, SEALANT-COATED, FIBER-REINFORCED GYPSUM PANEL

This is a division of application Ser. No. 08/109,494, pending, filed Aug. 20, 1993.

BACKGROUND OF THE INVENTION

The present invention relates generally to a process for making gypsum panel, and more particularly, to a process for making thin, sealant-coated, fiber-reinforced gypsum panel and the thin, sealant-coated, fire and indentation resistant gypsum panel made thereby.

Conventional gypsum wallboard or panel is typically manufactured from a plaster slurry wherein a wet slurry of gypsum, generally referred to as calcined gypsum, is placed between two layers of paper and the slurry is allowed a certain amount of time to set. The set gypsum is a hard and rigid product obtained when the calcined gypsum reacts with water to form calcium sulfate dihydrate. Calcined gypsum is either calcium sulfate hemihydrate ($CaSO_4 \cdot \frac{1}{2}H_2O$) or calcium sulfate anhydrite ($CaSO_4$). When calcium sulfate dihydrate is heated sufficiently, in a process called calcining, the water of hydration is driven off and there can be formed either calcium sulfate hemihydrate or calcium sulfate anhydrite, depending on the temperature and duration of exposure. When water is added to the calcined gypsum to cause the gypsum to set, in essence, the calcined gypsum reacts with water, and the calcined gypsum is rehydrated.

In typical gypsum wallboard, the two layers of paper contain the slurry and provide the strength required in installation and use. The wallboard is cut into discrete lengths to accommodate subsequent handling and then dried in heated dryers until the board is completely dry.

The bending strength of the wallboard depends on the tensile strength of the paper. The gypsum serves as a "spacer" and accounts for fire resistance and moisture absorbing and moisture releasing activities. The static properties are limited, and the surface treatment and the joint filler system are determined by the paper.

Although paper-covered wallboard has many uses and has been a popular building material for many years, it would be advantageous to provide gypsum panel which did not rely on paper for strength and other properties. A "faceless" water-resistant gypsum product is referred to in U.S. Pat. No. 5,135,805 and is defined as that does not include a facing sheet of paper, glass mat or similar material. According to U.S. Pat. No. 5,135,805, which is incorporated by reference herein in its entirety, such products typically contain reinforcing fibers, for example, cellulosic fibers, such as wood or paper fibers, glass fibers or other mineral fibers and polypropylene or other synthetic resinous fibers, and the reinforcing fibers can be about 10 to about 20 wt. % of the dry composition from which the set gypsum product is made. The density of such a product is typically within the range of about 50 to about 80 pounds/cubic ft. As known in the art, such "faceless" gypsum products can be formed from dry or aqueous-based compositions.

U.S. Pat. No. 5,135,805 refers to a process of incorporating siloxanes as water-resistant additives into water-resistant gypsum-based articles, particularly, an article which can be used to excellent advantage as the core of water-resistant gypsum wallboard, by adding the siloxane to water (including other optional liquid ingredients such as calcium lignosulfonate); mixing said siloxane/water admixture with calcined gypsum to form an aqueous slurry; and shaping and allowing said slurry to set to form a set gypsum based, water-resistant article.

Compositions containing calcium sulfate in hemihydrate or anhydrous form and fibrous additives, including paper fibers preferably derived from waste newspaper, capable of being formed into an unfaced building material having certain mechanical properties and/or fire resistance are referred to in U.S. Pat. No. 5,171,366 which is incorporated by reference herein in its entirety. In U.S. Pat. No. 5,171,366, paper fiber is combined with the calcium sulfate in the form of a pulp of paper stock that contains at least about 20 times more water than paper stock, wherein an aqueous dispersion, i.e., a slurry, of solids includes by weight about 53% to about 78% calcium sulfate, about 7% to about 30% cellulosic fiber, and preferably about 1.5% to about 35% performance booster selected from inorganic fiber, clay, vermiculite and binder polymer, together with a quantity of water at least about 25-fold in excess of that required to completely hydrate the calcined gypsum.

U.S. application Ser. No. 07/572,758, filed August 23, 1990, now U.S. Pat. No. 5,342,566, and assigned to the assignee of the present invention and a co-assignee by Schäfer et al., and which is incorporated by reference herein in its entirety, refers to a method of producing fiber gypsum board comprising the steps of mixing in a preliminary mixing step predetermined amounts of fibers and water respectively, to form a mixture of wetted, loose fibers; mixing in a mixing step the wetted fibers with a predetermined amount of dry calcined gypsum; premixing an accelerator with one of the components of dry calcined gypsum, fiber and water; promptly laying the mixed composition into a matt; immediately degassing the matt in a first decompression step, adding a predetermined amount of water onto the resultant matt; and immediately compressing the matt to form a board composed of bonded fibers and gypsum. Schäfer et al. refer to a homogeneous board which is preferably a gypsum board reinforced by fiber, such as paper fiber, wherein several layers of board forming materials are placed on each other before the board is fully formed, pressed, and dried, and wherein each of the layers is identical in composition.

Although new and improved gypsum panels can be made by the process of Schäfer et al., it is always desirable and advantageous to improve the strength and other properties of gypsum panels. For example, it is advantageous to provide gypsum panels less than 0.50 inch, and preferably, less than 0.375 inch, in thickness, i.e., thin gypsum panels, having high strength and which are fire and indentation resistant and resistant to moisture absorption. Such panels would be excellent substitutes for traditional products, such as wood, currently used, for example, for floor underlayment, soffit boards and the like.

SUMMARY OF THE INVENTION

In order to overcome the disadvantages of the prior art and to provide improved panels for those currently used, e.g., in the building industry, the present inventors have discovered a process for making a thin, sealant-coated, fire and indentation resistant gypsum panel from at least 2 homogeneous layers of fiber-reinforced gypsum.

In one aspect of the present invention, a layer of a mixture of cellulosic fibers, having a moisture content of about 40% by weight to about 100% by weight water based on the total weight of the dry composition, and a sufficient amount of an additive to restrict the adhesion of the cellulosic fibers to one another, is deposited on at least two separate conveyors to form a fibrous matt on each conveyor and a layer of a mixture of calcined gypsum and set accelerator is deposited on the fibrous matt on each conveyor, in amounts, based on the total weight of the dry composition, of about 70% to about 90% by weight gypsum, about 10% to about 19% by weight cellulosic fiber and about 1% to about 9% by weight of combined additive to restrict the adhesion of cellulosic fibers and set accelerator. Each layer on each conveyor is directed to a mixing station to uniformly mix the fibrous matt and dry gypsum to form a homogeneous layer, and the formed homogeneous layers are placed atop one another on a single conveyor to form a combined homogeneous layer thereof. The combined homogeneous layer is subjected to pressure (compressed) to form a pressed, homogeneous fiber-reinforced gypsum panel. A sufficient amount of water is added to the layer or layers to rehydrate the calcined gypsum. The pressed, homogeneous fiber-reinforced gypsum panel is dried, and the surface of the dried panel is sealed with a wax-free, water resistant sealant.

In accordance with the present invention, the water required for rehydration of the dry calcined gypsum is only partially incorporated in moistening of the cellulosic fiber, and a post moistening step is carried out after the wetted or moistened cellulosic fiber and dry calcined gypsum are mixed, preferably just prior to the compression of the resultant layer. The moist cellulosic fibers are mixed with the dry calcined gypsum at about the same time that the dry calcined gypsum and moist fibers are transferred onto a conveyor. Since the resultant mixture is immediately pressed, this method permits the maximum acceleration of the dry calcined gypsum by adding accelerating agents to the dry calcined gypsum, the water, the fibers, and/or the additive to restrict the adhesion of cellulosic fibers. By utilizing an extremely fast reacting accelerator with the water for the post-moistening step, i.e., when a sufficient amount of water is added to the layer or layers to rehydrate the calcined gypsum, extremely fast setting can be accomplished. The setting of the dry calcined gypsum and most of the hydration are essentially carried out within a few minutes while the fibrous matt is compressed in a continuous pressing operation. This process reduces the springback of the panel. It is thus possible to obtain panels having smooth surfaces, limited thickness tolerances and a high strength without additional sanding.

By the process and compositions of the present invention, a sealant-coated, fire and indentation resistant gypsum panel having a density of about 60 to about 80 lbs./ft.$^3$ and a dry thickness of about 0.25 inch is made from 2 homogeneous layers of fiber-reinforced gypsum, or in another aspect of the present invention, a sealant-coated fire and indentation resistant gypsum panel having a density of about 65 to about 80 lbs./ft.$^3$ and a dry thickness of about 0.375 inch is made from 3 homogeneous layers of fiber-reinforced gypsum. In still another aspect of the present invention, the panel made by the process of the present invention is a sealant coated, fiber-reinforced gypsum floor underlayment.

It is to be understood that both the foregoing general description and the following detailed description are exemplary and explanatory and are intended to provide further explanation of the invention as claimed.

DETAILED DESCRIPTION

The ingredients used in the process, compositions and panels of the present invention for making a thin, sealant-coated, fire and indentation resistant gypsum panel include gypsum, cellulosic fiber, water, additive to restrict the adhesion of cellulosic fibers and set accelerator.

The gypsum is calcined gypsum and is capable of reacting with water to form set gypsum as well known in the art. The reaction of calcined gypsum and the rehydration thereof are discussed above, and the calcined gypsum which can be used in the process of the present invention, can be in the hemihydrate form or in the anhydrous form or mixtures thereof.

The dry, calcined gypsum used in the process of the present invention can be derived from any conventional source of gypsum, i.e., calcium sulfate, including natural gypsum, chemical gypsum, calcium sulfate resulting from FGD (flue gas desulfurization), scrap gypsum wallboard and the like.

The amount of calcined gypsum which may be used in the process, compositions and panels of the present invention, is about 70% to about 90% by weight on a dry weight basis. In certain preferred embodiments in accordance with the present invention, the amount of calcined gypsum is about 76% to about 80% by weight, on a dry weight basis. Unless stated otherwise, as used herein, the term "% by weight" means weight percent based on the total weight of the dry ingredients used to prepare the gypsum panel.

The cellulosic fibers which are used as the reinforcing fibers in the thin, sealant-coated, fire and indentation resistant gypsum panels, compositions and process of the present invention, may be any suitable fibers which are capable of serving as a water carrier. Cellulosic fibers include the fibrous component of plants, such as cotton, linen and flax, for example. In accordance with the present invention, the preferred fibers are recycled paper fibers, especially recycled newsprint, or reject fibers of pulp production, wood fibers or mixtures thereof with various mineral fibers that are capable of serving as a water barrier. Waste newspaper provides a very satisfactory form of cellulosic fiber for use in the process, compositions and panels of the present invention.

The amount of dry cellulosic fiber which may be used in the process, compositions and panels of the present invention to make a thin, sealant-coated, fire and indentation resistant gypsum panel, is about 10% to about 19% by weight, on a dry weight basis. In preferred embodiments of the present invention, about 12% to about 16% by weight cellulosic fiber is used in the process and compositions for making the gypsum panel.

The size of the cellulosic fibers is not critical in the process, compositions or panels of the present invention, and cellulosic fibers obtained from recycled newsprint are of a suitable size to be used in the process, compositions and panels of the present invention. Generally, the fibers are about 0.1 mm to about 10 mm in length and more preferably about 1.0 mm to about 4.0 mm.

As indicated above, the cellulosic fiber must be capable of carrying part of the water which is used to react with the calcined gypsum, as will be discussed in more detail below.

About 1% to about 9% by weight, based on the total weight of the dry composition, of additives defined herein as additive to restrict the adhesion of cellulosic fibers and set accelerator are used in the process, compositions and panels of the present invention. In certain preferred embodiments, the combined additive to restrict the adhesion of cellulosic fibers and set accelerator are present in amounts of about 2.0 to about 6.5 percent by weight, on a dry weight basis.

In accordance with the present invention, the cellulosic fibers are moistened by adding water to the fibers. The additive to restrict the adhesion of cellulosic fibers, also referred to herein as a fiber adhesion-restricting additive, prevents the fibers from balling at a high fiber moisture content. The additive to restrict the adhesion of cellulosic fibers preferably also reduces the springback of the pressed, undried panel by softening the cellulosic fibers. The use of additive to restrict the adhesion of cellulosic fibers also significantly increases the strength of the finished panel. Thus, in accordance with the present invention, the fiber adhesion-restricting additive is added to and mixed with the cellulosic fibers to reduce or prevent the problem of fiber balling. The fiber adhesion-restricting additive or additives restrict the adhesion of the fibers to one another by encapsulating the fibers. Accordingly, fiber adhesion-restricting additives which may be used in the process, compositions and panels of the present invention, are those which allow absorption of water and prevent fibers from adhering to one another. Examples of additives which restrict the adhesion of cellulosic fibers which may be used in the process of the present invention, are raw gypsum, which at the same time serves to accelerate the setting of the gypsum, whitening, bentonite, magnesium oxide (MgO), cement and lime (CaO or Ca(OH)$_2$). The use of additives which restrict the adhesion of cellulosic fibers allows adding up to 160% moisture per 100% dry fibers, which varies however, with the kind of fiber and fiber adhesion-restricting additive use.

In accordance with a preferred embodiment of the present invention when paper fibers are used, lime, particularly CaO, soft burned, is added during the milling of the dry paper into fibers and may be used as a preferred mixture of cellulosic fibers and a sufficient amount of additive to restrict the adhesion of the cellulosic fibers to one another.

The amount of lime or other additive or mixture of additives added to the cellulosic fiber required to avoid fiber balling varies depending on the type of fiber and the degree of moisture. However, in preferred embodiments of the present invention, about 0.1% to about 1.0% by weight, on a dry weight basis, lime is mixed with the cellulosic fibers.

An accelerator or a mixture of accelerators may be used in the process of the present invention as described in U.S. patent application Ser. No. 07/572,758, filed Aug. 23, 1990, now U.S. Pat. No. 5,342,566. Since the calcined gypsum is wetted in the process of the present invention by mixing the calcined gypsum with the moistened fibers only just before pressure is applied thereto, strong accelerator additives can be introduced into the gypsum mixture or the fiber mixture, resulting in extremely quick setting of the calcined gypsum when it reacts with water.

The accelerator additives can be added to the wetted fibers before they are mixed with the calcined gypsum, or can be added in dry form to the calcined gypsum before it is mixed with the fibers. Preferably, a sufficient amount of one or more accelerator additives is added to cause the wetted gypsum fiber mixture to set within the desired time period. In most embodiments of the present invention, the set accelerator is used in an amount of about 0.5% to about 8.0% by weight, on a dry weight basis, and in preferred embodiments, it is mixed with the calcined gypsum. Conventional set accelerators may be used in the composition and process of the present invention, including potassium sulfate, gypsum powder, recycled GFB (gypsum fiberboard) waste, waterglass and the like. In one embodiment in accordance, with the present invention, a mixture of about 0.8% to about 1.2% by weight gypsum powder and about 0.5% to about 1% by weight potassium sulfate are used as set accelerator and are combined or mixed with the calcined gypsum.

Other additives which are well known in the art and described in, for example, U.S. Pat. No. 5,171,366 and defined as performance boosters cannot be used in the process and composition of the present invention. Such performance boosters as inorganic fiber, clay, vermiculite, perlite and binder polymer cannot be used in the process of the present invention or added to the composition of the present invention. Such additives prevent the manufacture of thin, indentation resistant gypsum panels and cause excessive springback during manufacture. However, other conventional additives, such as, dispersing agents, additives for restricting the adhesion of cellulosic fibers and set accelerators, as discussed above, and the like may be used in the process and compositions of the present invention. Furthermore, conventional glue and adhesive materials are also excluded from the process and compositions of the present invention.

Water is generally added during the process of the present invention in at least two separate operations or steps. The total amount of water added during the process of the present invention is desirably an amount sufficient to rehydrate the calcined gypsum, i.e., react with calcined gypsum to form calcium sulfate dihydrate which is the hard and rigid product referred to as set gypsum. Although a slight excess of water can be added to the composition of the present invention, an excess of water which would be sufficient to form a slurry of the composition is to be avoided in the present invention. All that is required in accordance with the process and compositions of the present invention is a sufficient amount of water to hydrate or rehydrate the calcined gypsum.

In the process of the present invention, a mixture of cellulosic fibers having a moisture content of about 40% to about 100% by weight water and an additive to restrict the adhesion of cellulosic fibers is deposited on conveyors. The percent by weight of water is based on the total weight of the dry composition. The cellulosic fiber and additive are mixed with water as described, for example, in U.S. patent application Ser. No. 07/572,758, now U.S. Pat. No. 5,342,566.

At least one additional wetting step is used in accordance with the process of the present invention where the balance of the water is added to the calcined gypsum in an amount sufficient to rehydrate the calcined gypsum. As explained above, water absorbed in the cellulosic fibers and additive to restrict the adhesion of cellulosic fibers provides less than the amount of water required to completely rehydrate the calcined gypsum, e.g., on the order of about 20% to about 100% by weight, and more preferably about 30% to about 50% by weight, of the total amount of water required for complete hydration of the calcined gypsum. Accordingly, additional water must be added to the composition, and as described in more detail below, additional water is added to a layer or layers of the gypsum composition in a sufficient amount to rehydrate the calcined gypsum. This may be achieved in one or more steps of the process of the present invention as described in more detail below wherein an additional amount of water, for example, about 40% to about 60% by weight based on the weight of the dry panel, is added during one or more subsequent process steps.

Because the mixture of wetted fibers and dry calcined gypsum are already wetted, the water added, for example, sprayed onto the layer or layers or the panel, is readily accepted by the layer or layers or panel and migrates into the layer or layers or panel. A sufficient amount of water is added onto the layer, layers and/or panel to hydrate the calcined gypsum to optimum strength of the panel and to ensure that the calcined gypsum receives a sufficient amount of water to fully hydrate. If water is sprayed onto a layer, layers and/or panel, it is preferably sprayed onto both sides.

In the process of the present invention the mixture of cellulosic fibers having a moisture content of about 40% by weight to about 100% by weight water and a sufficient amount of an additive to restrict the adhesion of the cellulosic fibers to one another, and other optional additives is deposited on at least two separate conveyors to form a fibrous matt on each conveyor. Since the panel of a desired thickness is formed by combining two or more homogeneous layers of uniformly mixed fibrous matt and dry gypsum, e.g., by placing one homogeneous layer from one conveyor atop at least one other homogeneous layer on another conveyor, the number of conveyors used to form a fibrous matt is dependent on the desired thickness of the final product. If, for example, a pressed, homogeneous fiber-reinforced gypsum panel having a maximum dry thickness of about 0.25 inch is desired, then a fibrous matt is deposited on two separate conveyors. If, for example, a pressed, homogeneous fiber-reinforced gypsum panel having a maximum dry thickness of about 0.375 inch is desired, then a fibrous matt is deposited on three separate conveyors.

The cellulosic fiber can be milled or dissolved and/or wetted by different apparatuses. For dry waste paper, wing beater mills can be used, provided that an additional system is added for spraying in the setting waters in the dry flow of fibers. Solutions with accelerators, and other additives can be optionally added to the fibers along with the water.

For wet-processed waste paper fibers (e.g. from collected household waste paper), reject fibers of pulp production, or thermomechanically refined wood fibers, pulverizing mills can be used. Pulverizing mills operate with screens on the principle of forcing fibers against and through a fine mesh screen. At the same time, for dry paper or for additional moistening, water is sprayed into the pulverizing mill.

One method of making the cellulosic fiber, additive to restrict the adhesion of cellulosic fibers and water mixture is by forming wetted fibers in rotary mills. Metered amounts of the additive, e.g., lime, are added simultaneously with the metered feeding of the fiber mills with dry (average moisture of 10%) disintegrated waste paper. The dry fibers are moistened in an air flow inside the mills during or shortly after the milling. This is achieved by spraying water, e.g., a sufficient amount to provide a moisture content of about 90% by weight to about 160% by weight, based on the weight of the dry fiber, in the mixture, into wing beater or pulverizing mills as they operate.

Depending upon the desired form of a panel or board, metered amounts of moistened fibers and dry calcined gypsum are dispensed in layers on a forming belt, defined herein as a conveyor. The wetted cellulosic fibers are preferably layered onto each of two or more conveyor belts to form a matt on each conveyor belt, and the gypsum is then layered onto the matt of wetted fiber.

In accordance with the process of the present invention, a layer of calcined gypsum, preferably having set accelerator mixed therein, is deposited on the fibrous matt on each conveyor. The amounts of the ingredients deposited in the layers, i.e., the fibrous matt and the calcined gypsum layer, on each conveyor, on a dry weight basis, are about 70% to about 90% by weight gypsum, about 10% to about 19% by weight cellulosic fiber and about 1% to about 9% by weight of combined additive to restrict the adhesion of cellulosic fibers and set accelerator. Dry additives can be added to the dry calcined gypsum or to the additive to restrict the adhesion of cellulosic fibers. Moist additives, soluble or liquid, can be added to the water or to the moistened fibers, or can be sprayed on the layer or layers deposited on the conveyor. Liquid or moist additives are not added to the dry calcined gypsum and thus avoids premature rehydration of the calcined gypsum.

Each layer of dry calcined gypsum on a fibrous matt on each conveyor is then directed to a mixing station to uniformly mix the fibrous matt and dry gypsum to form a homogeneous layer. Each layer of dry gypsum on a fibrous matt is vertically mixed and at the same time transferred onto another conveyor, e.g., a forming belt or conveyor on which a vertically mixed dry calcined gypsum and fibers (from the fibrous matt) are deposited to form a homogeneous layer. The thorough mixing of the wetted fibers and gypsum is preferably carried out in vertical pinwheels. The vertical mixing, however, is best achieved with a particular device which accounts for the difficult mixing characteristics of the moist fibers. This is accomplished by (horizontally) offset spiked disk rollers which permit a uniform mixing of the moist fibers without the formation of balls.

The resultant matt of wetted fibers and gypsum, i.e., homogeneous layer, which in preferred embodiments is about 1 inch thick, formed on a conveyor belt is placed on top of at least one other resultant matt of wetted fibers and gypsum, e.g. a second and/or a third homogeneous layer, each of which in preferred embodiments is about 1 inch thick, and each formed on a separate conveyor or conveyors by a production line or lines similar to, if not identical with, the production line described above to form a combined homogeneous layer thereof. As described above, if a maximum dry thickness of about 0.25 inch is desired in the final product, the homogeneous layer of one production line is placed on the homogeneous layer of a second production line and if a maximum dry thickness of about 0.375 inch is desired, the homogeneous layers of three production lines are placed on a single conveyor to form a combined homogeneous layer thereof, and the like. In accordance with the process of the present invention, the layers formed on each conveyor or production line can vary in thickness and/or in composition, as desired. For example, the thickness of a layer on one conveyor can be 1 inch and the thickness of a layer on a separate conveyor can be 0.75 inch. The thickness of the layers prior to pressing is not critical as long as the combined layers are of a sufficient thickness to provide a pressed, dried panel of the desired thickness and density.

The combined homogeneous layer on a conveyor is then subjected to degassing and compression in a pressure station, defined herein as subjecting the combined homogeneous layer to pressure. The degassing and compressing are carried out after the combined homogeneous layer is formed and degassing and compression may be first achieved by opposed conveyor belts which preferably are air-permeable belts. As the combined homogeneous layer is initially compressed between an air-permeable belt and a non-permeable belt which gradually incline toward each other, the gas is pressed out of the entire mixture. When degassing of the combined homogeneous layer is carried out in the compression station, the formed matt is compressed to nearly desired thickness. To the extent that a springback does occur, the air absorbed thereby can be pressed out again without the formation of bubbles/separations when the combined homogeneous layer parts from the air permeable belts and enters the main rollers of the compression station.

The combined homogeneous layer degassed, e.g., by pressing between opposed conveyor belts, or the combined homogeneous layer which has not been degassed, is subjected to pressure to form a pressed, homogeneous fiber-reinforced gypsum panel. The compression is carried out in a continuous press where the combined homogeneous layer enters the press prior to the initial setting. The press preferably includes a compressing station (to provide the necessary compressive power) and a calibrating station (to compensate the springback pressure—elastic restoring force). The principle applied is that of a rolling press which is significantly less expensive than, for example, continuous, area-specific presses (individual rollers or rods of very thin diameters and support surfaces, in all cases covered with steel bands for these pressure requirements).

In the compression station, the combined homogeneous layer can be compressed beyond the desired thickness to reduce the springback to a minimum. However, in accordance with the present invention, pressure sensitive additives, e.g., performance boosters, such as vermiculite, perlite, binder polymer, clay, inorganic fiber and the like, are excluded from the process, compositions and pressed panel, and accordingly minimum degassing is required and there is a minimum of springback. If springback is experienced in the combined homogeneous layer, it is also possible to press by fixed stops only to the desired final thickness of the wet panel leaving the press. The adjustment of the acceleration can be made so the setting for the most part can be completed inside the press. The matt (panel) as it leaves the compression station is substantially set if there is a sufficient amount of water to rehydrate the calcined gypsum prior to or during the compression step, so that only a minimum force is necessary to hold the matt to the desired thickness, in an optional calibration station.

The roller presses permit an increase of the pressing times to 2–3 minutes and permit the plaster to reach about 80% to about 90% of the wet strength through a maximum acceleration of the setting process inside the press. This maximum acceleration also significantly reduces springback and minimizes the amount of compression needed in the optional calibration step. This facilitates the operation in the calibration station and allows the creation of boards or panels having a higher strength and smoother surfaces, as well as panels with small thickness tolerances which do not require subsequent sanding of the dry boards or panels.

As discussed above, during or subsequent to mixing of the fibrous matt and dry calcined gypsum, water must be added in a sufficient amount to the layer or layers to rehydrate or set the calcined gypsum. As indicated above, there is an insufficient amount of water in the mixture of cellulosic fibers and additive to completely rehydrate or set the calcined gypsum, and consequently subsequent addition of water is required. Thus, additional water is added in an amount sufficient to rehydrate or set the calcined gypsum so that there is complete hydration or setting of the gypsum with the combined water from the moisture in the mixture of cellulosic fiber and additive to restrict the adhesion of cellulosic fibers and the water subsequently added to the layer, layers and/or panel.

Thus, in the process of the present invention, there are at least two separate watering steps. For example, when dry waste paper is used, it can be moistened up to 150% by weight of water without balling. However, to preserve strength, the fibers preferably are only moistened to about 40% by weight to about 100%, and more preferably about 40% by weight to about 90% by weight based on the total weight of the dry composition and exposed to subsequent moistening which depends on the fiber content of the composition. The reduced moisture content of the fibers creates less contamination of the apparatus in contact with the final mixture, especially the mixing heads. For a board having a fiber content of about 16%, this corresponds to a water-calcined gypsum ratio of about 0.48 to about 0.54. Therefore, about 40% to about 80%, and preferably about 45% to about 65% (by volume) of the total water must be incorporated or added in a subsequent second step or steps.

Excess water can be added to the formed layers or panels as desired, e.g., about 15% to about 25% by weight excess can be added, however, it is undesirable to add excess water beyond 30% because only a sufficient amount of water to achieve complete hydration is required and excess water must be removed by drying, a step which consumes extra time and energy. As explained previously, slurries of the composition must be avoided. Slurries cannot be used in the process of the present invention.

In accordance with the present invention, water may be added in a second step at any convenient step or station in the process where there will be no inconvenience due to premature setting of the calcined gypsum. For example, water may be added when each layer on each conveyor is directed to the mixing station; at the mixing station; when the homogeneous layers are directed onto one another on the conveyor from the mixing station; prior to, during or after the separate homogeneous layers are combined to form a combined homogeneous layer; prior to, during or subsequent to degassing; and/or prior to or after subjecting the combined homogeneous layer to pressure. During this second step for the addition of water, about 45% to about 65% by weight water, based on the weight of the dry fiber, is added.

Water is preferably added subsequent to degassing of the composition. The premoistened and precompressed composition (combined homogeneous layer) accepts water absorption at a substantially higher degree than a completely dry material. Moreover, a matt exiting a degassing (pressure) station has sufficient strength for a free release onto a parted opposed forming or conveyor belt in order to allow both the top and bottom surfaces of the panel to be further moistened. If water is added at this point, the material absorbs water, instead of air, by suction during springback. The water supplied onto the panel may contain strongly effective accelerating agents or other additives increasing the speed of setting, since a final compression is carried out immediately afterwards.

The addition of water onto the top and/or bottom of the layer allows the moist surfaces of the panel to release from the upper and lower forming or conveyor belt more smoothly after the application of the water. The water is preferably applied by spraying; however, other well-known techniques may be used including moistening or flooding the surface of the conveyor belt prior to contact with the layer.

The incorporation of the water into the combined homogeneous layer or the pressed panel is made possible by absorption. The water preferably is added in the gap which forms between the layer and the conveyor or belt. As indicated above, the amount of water added depends on the water necessary for the hydration of the dry calcined gypsum to an optimum of strength, the absorption capacity of the respective layer or panel and the initial composition of the fiber and moisture mixture.

The pressed, homogeneous fiber-reinforced gypsum panel is dried in conventional ovens to remove excess moisture. Generally, drying is carried out at an elevated temperature which is typically about 80° C. to about 130° C.

Subsequent to drying, the surface of the faceless panel is sealed with a wax-free, water resistant sealant. A sufficient amount of sealant coating material is applied to the surface to provide a uniform, continuous coating or layer on the surface upon drying. Generally, the sealant is applied to the surface of the panel at a wet thickness of about 4 to about 20 mils and subsequently cured and/or dried. Any conventional method, e.g., spraying, roller coating, dipping, flooding and the like, may be used for applying the sealant which is generally in the liquid form. In accordance with the present invention, any wax-free, water resistant sealant which will reduce water absorption into the panel, which will provide a smooth surface, and in certain instances, which will reduce glue or adhesive absorption into the panel when the panel is used adjacent a layer of glue, may be applied to the surface of the panel. Preferred sealants are water-based or water-soluble. In a preferred embodiment of the present invention, the sealant is a siliconate mixture.

The sealant applied to the surface of thin, fire and indentation resistant gypsum panel in accordance with the present invention increases the durability of the panel and creates a resistance to moisture, glues and adhesives and the like. The thin, sealant-coated, fire and indentation resistant gypsum panel made by the process of the present invention retains its dimensional stability when subjected to high moisture conditions and surpasses the traditional plywood, oriented strand board and lauan floor underlayments in retaining dimensional stability. In the thin, sealant-coated, fire and indentation resistant gypsum panels of the present invention, linear variation due to change in moisture content has been substantially reduced and edge thickness swell has been substantially eliminated. The smooth, durable surface resulting from the process of making and the composition of the fiber-reinforced gypsum panel provides an excellent base for a variety of floor coverings including thin resilient floor cover, vinyl tile, parquet flooring, carpet, ceramic tile, quarry tile, hardwood flooring and the like.

The thin, sealant-coated, fire and indentation resistant panels of the present invention may be cut and stored in the same manner as conventional gypsum wallboard even though the panels of the present invention may have a thickness of only about 0.25 inch.

The thin, sealant-coated, fire and indentation resistant panels of the present invention have a density of about 60 lbs./ft.$^3$ to about 80 lbs./ft.$^3$ In certain preferred embodiments of the present invention, gypsum panels have a thickness of about 0.375 inch (9.5 mm) and a uniform density of about 66 lbs./ft.$^3$ and in more preferred embodiments, gypsum panels have a thickness of about 0.25 inch (6.4 mm) and a density of about 75 lbs./ft.$^3$. Without the use of such performance boosters as vermiculite, perlite, resin binders, mineral fibers, clay and the like, thin, fire resistant, cellulosic fiber reinforced gypsum panels having a high density, a smooth surface and high indentation resistance have been made by the process of the present invention by using only calcined gypsum, cellulosic fiber, additive to restrict the adhesion of cellulosic fibers and set accelerator in specified amounts assembled from at least two homogeneous layers of the composition. Without the use of a core and without the use of the performance boosters discussed above, a fiber-reinforced gypsum panel having a thickness of about 0.25 inch can be made from two one-inch thick homogeneous layers of fiber-reinforced calcined gypsum, or a fiber-reinforced gypsum panel having a thickness of about 0.375 inch can be made from three one-inch thick homogeneous layers of fiber-reinforced calcined gypsum. As used herein, "thin" is defined as a thickness of about 0.25 inch for a gypsum panel made from two approximately one-inch thick layers of fiber-reinforced calcined gypsum.

The following specific example describes a composition of this invention. It is intended for illustrative purposes only and should not be construed as limiting the present invention.

Unless otherwise specified, all parts and percentages are by weight based on total weight of the dry composition.

Fiber-reinforced gypsum panels having a thickness of 0.25 inch (¼") and 0.375 inch (⅜") were made by the process of the present invention. The 0.25 inch panel was made from 2 homogeneous layers having a composition of 80% by weight gypsum, 14% by weight recycled paper fibers and 5% by weight additives wherein the additives were lime, potassium sulfate and gypsum powder. The 0.375 inch panel was made from 3 homogeneous layers having a composition of 80% by weight gypsum, 14% by weight recycled paper fibers and 5% by weight of the same additives shown above. A 12 mil (wet thickness) coating of siliconate water-based resin was applied to the surface of the panels.

The panels were tested with other conventional floor underlayment products using standard ASTM tests as specified in Tables 1–3 below.

TABLE 1

Underlayment Comparison Testing
Edge Thickness Swell

| | CONDITIONED 88°F. (28°C.)/85% RH | | 24 HOUR WATER SUBMERSION | | |
|---|---|---|---|---|---|
| | AVG. WGT. | AVG. THICKNESS | AVG. THICKNESS | THICKNESS DIFFERENCE | % INCREASE THICKNESS |
| ⅜" (9.5 mm) Panel of the Invention | 4.95 g | .385" (9.78 mm) | .388" (9.98 mm) | .003" (.08 mm) | .78% |
| ¼" (6.4 mm) FIBERBOND | 3.48 g | .258" (6.58 mm) | .281" (8.83 mm) | .002" (.05 mm) | .77% |
| 5.2 mahogany lauan | 1.54 g | .207" (5.96 mm) | .270" (5.59 mm) | .013" (.33 mm) | 8.28% |
| ¼" (8.4 mm) oriented strand board (OSB) | 1.81 g | .235" (5.96 mm) | .313" (7.96 mm) | .078" (1.98 mm) | 33% |
| ¼" (8.4 mm) competitor #1 (plywood) | 1.44 g | .244" (8.20 mm) | .261" (6.63 mm) | .017" (.43 mm) | 7.00% |
| ⁵⁄₁₆" (7.94 mm) competitor #2 (plywood) | 2.15 g | .833" (8.45 mm) | .357" (9.07 mm) | .024" (.81 mm) | 7.20% |

TABLE 2

Underlayment Comparison Testing
Linear Variation

|  | MACHINE DIRECTION AVERAGE % CHANGE LENGTH | MACHINE DIRECTION AVERAGE % CHANGE LENGTH | OVERALL % CHANGE LENGTH |
|---|---|---|---|
| ⅜" (9.5 mm) FIBERBOND | .081% | .064% | .053% |
| ¼" (6.4 mm) FIBERBOND | .070% | .072% | .071% |
| 5.2 mahogany lauan | .083% | .075% | .078% |
| ¼" (8.35 mm) oriented strand board (OSB) | .140% | .193% | .187% |
| ¼" (8.35 mm) competitor #1 | .119% | .109% | .114% |
| 5/16" (7.94 mm) competitor #2 | 141% | .080% | .114% |

TABLE 3

Underlayment Comparison Testing
Indentation Resistance

|  | INDENTATION RESISTANCE @ .100" PENETRATION FORCE AVERAGE (LBF) | INDENTATION RESISTANCE @ .222" PENETRATION FORCE AVERAGE (LBF) |
|---|---|---|
| ⅜" (9.5 mm) FIBERBOND | 373 | 674 |
| ¼" (6.4 mm) FIBERBOND | 550 | 1150 |
| ¼" (8.35 mm) oriented strand board (OSB) | 432 | 984 |
| 5.2 mahogany lauan | 385 | 780 |
| ¼" (8.35 mm) competitor #1 (plywood) | 301 | 587 |
| 5/16" (7.94 mm) competitor #2 (plywood) | 301 | 661 |
| 5/16" (7.94 mm) Douglas fir (plywood) | 284 | 568 |

From the data in Tables 1–3, it can be seen that the thin, sealant-coated, fire and indentation resistant, fiber-reinforced gypsum panels of the present invention are superior to the prior art panels currently used for floor underlayment.

It will be evident that the process and compositions within the scope of this invention can be employed to make any number of different structural building materials, all within the scope of this invention, but not specifically enumerated hereinabove. Although several specific building products utilizing this invention have been named, many more will be evident to those skilled in the art.

It will be apparent to those skilled in the art that various modifications and variations can be made in the process, compositions and panels of the present invention without departing from the spirit or scope of the invention. Thus, it is intended that the present invention cover the modifications and variations of this invention provided they come within the scope of the appended claims and their equivalents.

What is claimed is:

1. A sealant-coated, fire resistant, indentation resistant gypsum panel having a density of 60 to 80 lbs./ft.$^3$ made from at least 2 homogeneous layers of fiber-reinforced gypsum made by the process comprising:

a. depositing a mixture consisting essentially of cellulosic fibers having a moisture content of about 40–100% by weight water and a sufficient amount of an additive to restrict the adhesion of the cellulosic fibers to one another, on at least two separate conveyors to form a fibrous matt on each conveyor;

b. depositing a layer consisting essentially of a mixture of calcined gypsum and set accelerator on the fibrous matt on each of said separate conveyors, the amount of cellulosic fibers, calcined gypsum and combined additive to restrict the adhesion of the cellulosic fibers and set accelerator of steps (a.) and (b.) combined and expressed on a dry weight basis being about 10% to 19% by weight cellulosic fibers in step (a.), about 70% to 90% by weight calcined gypsum in step (b.) and about 1% to 9% by weight of the combined additive of step (a.) and set accelerator of step (b.);

c. directing each layer on the fibrous matt on each of said separate conveyors to a mixing station and mixing the fibrous matt and calcined gypsum on each of said separate conveyors to form a homogeneous mixture on each of said separate conveyors;

d. placing the homogeneous mixture as a layer from each of said separate conveyors on a single conveyor to form a combined homogeneous layer thereof;

e. subjecting the combined homogeneous layer to pressure to form a pressed, homogeneous fiber-reinforced gypsum panel;

f. adding a sufficient amount of water in at least one of the preceding steps (c.) through (e.) to rehydrate the calcined gypsum;

g. drying the pressed; homogeneous fiber-reinforced gypsum panel; and h. sealing the surface of the dried panel with a wax free, water resistant sealant.

2. A panel according to claim 1, made from 2 homogeneous layers of fiber-reinforced gypsum wherein the thickness of the sealant-coated panel is approximately 0.25 inch.

3. A panel according to claim 2, wherein the panel is fiber-reinforced gypsum floor underlayment.

4. A panel according to claim 1, made from 3 homogeneous layers of fiber-reinforced gypsum wherein the thickness of the sealant-coated panel is approximately 0.375 inch.

5. A panel according to claim 4, wherein the panel is fiber-reinforced gypsum floor underlayment.

6. A panel according to claim 1, wherein the additive to restrict the adhesion of cellulosic fibers is lime.

7. A panel according to claim 6, wherein about 0.1% to 1.0% by weight of the additive is mixed with the cellulosic fibers.

8. A panel according to claim 1, wherein the set accelerator is potassium sulfate, gypsum powder, recycled gypsum fiberboard waste or a mixture thereof.

9. A panel according to claim 8, wherein about 0.5% to 8% by weight of set accelerator is in each mixture of set accelerator and calcined gypsum.

10. A panel according to claim 1, wherein the layer and fibrous matt on each of said separate conveyors in step (b.) consists essentially of about 76% to 80% by weight gypsum, about 12% to 16% by weight cellulosic fibers and a total of about 2.0% to 6.5% by weight of additive to restrict the adhesion of cellulosic fibers and set accelerator.

11. A panel according to claim 1, wherein the cellulosic fibers are recycled newsprint.

* * * * *